United States Patent [19]

Abali

[11] Patent Number: 5,355,364
[45] Date of Patent: Oct. 11, 1994

[54] METHOD OF ROUTING ELECTRONIC MESSAGES

[75] Inventor: Bulent Abali, Danbury, Conn.

[73] Assignee: International Business Machines Corporation, Armonk, N.Y.

[21] Appl. No.: 969,690

[22] Filed: Oct. 30, 1992

[51] Int. Cl.$^5$ .............................................. H04J 3/24
[52] U.S. Cl. ........................................ 370/54; 370/60;
    370/94.1; 340/826
[58] Field of Search ................. 370/54, 94.1, 60, 14,
    370/16, 53, 58.1, 58.2, 58.3, 61; 340/826,
    825.03, 827; 364/200

[56] References Cited

U.S. PATENT DOCUMENTS

| | | | |
|---|---|---|---|
| 4,466,060 | 8/1984 | Riddle | 364/200 |
| 4,814,973 | 3/1989 | Hillis | 364/200 |
| 4,814,979 | 3/1989 | Neches | 364/200 |
| 4,873,517 | 10/1989 | Baratz et al. | 370/54 |
| 4,905,233 | 2/1990 | Cain et al. | 370/94.1 |
| 4,939,726 | 7/1990 | Flammer et al. | 370/94.1 |
| 4,987,536 | 1/1991 | Humblet | 364/200 |
| 4,993,016 | 2/1991 | Richards | 370/54 |
| 4,995,035 | 2/1991 | Cole et al. | 370/95.2 |
| 5,014,262 | 5/1991 | Harshavardhana | 370/16 |
| 5,016,163 | 5/1991 | Jesshope et al. | 364/200 |
| 5,034,945 | 7/1991 | Kimoto et al. | 370/13.1 |
| 5,056,085 | 10/1991 | Vu | 370/60 |
| 5,083,265 | 1/1992 | Valiant | 395/800 |
| 5,115,433 | 5/1992 | Baran et al. | 370/94.3 |
| 5,115,495 | 5/1992 | Tsuchiya et al. | 370/94.1 |
| 5,128,932 | 7/1992 | Li | 370/60 |
| 5,130,977 | 7/1992 | May et al. | 370/60 |
| 5,140,583 | 8/1992 | May et al. | 370/60 |
| 5,142,531 | 8/1992 | Kirby | 370/94.3 |
| 5,166,927 | 11/1992 | Iida et al. | 370/54 |
| 5,243,592 | 9/1993 | Perlman et al. | 370/54 |

FOREIGN PATENT DOCUMENTS 0426911 5/1991 European Pat. Off. .
4167845 6/1992 Japan .

OTHER PUBLICATIONS

Even, S. *Graph Algorithms*, Computer Science Press, 1979, pp. 11–13, 20 and 21.
Gibbons, A. *Algorithmic Graph Theory* Cambridge University Press, 1985, pp. 21 and 35.
John Spragins, "Telecommunications Protocols and Desigh", Feb. 1991, pp. 355–361 and 391.

*Primary Examiner*—Douglas W. Olms
*Assistant Examiner*—Huy D. Vu
*Attorney, Agent, or Firm*—Marc D. Schechter; Robert P. Tassinari, Jr.

[57] ABSTRACT

A method of sending an electronic message from a source station through a network of switches and links to a destination station. An electronic message is sequentially sent to each of a series of switches. Each switch reads a route signal in the message and sends the message to a switch or a station having an input port connected to an output port identified by the route signal. The route signals are generated by storing a weight for each switch link in the network. Candidate paths through the switch network starting at the source station and ending at initial candidate destinations are identified. Each initial candidate destination has an input port directly connected to an output port of a switch having an input port directly connected to the source station. If one or more candidate destinations are the destination station, a candidate path ending at the destination station is selected, and a series of route signals corresponding to the selected candidate path is generated. If no candidate destination is the destination station, extended candidate paths are formed. Each extended candidate path has a path weight comprising the weights of switch links along the candidate path. If one or more extended candidate destinations are the destination station, a candidate path ending at the destination station and having a path weight better than or equal to the path weight of each other candidate path ending at the destination station is selected. Otherwise, the candidate paths are again extended.

28 Claims, 4 Drawing Sheets

METHOD OF ROUTING ELECTRONIC MESSAGES

BACKGROUND OF THE INVENTION

The invention relates to electronic communication. More specifically, the invention relates to sending electronic messages from a source station through a network of a plurality of switches and links to a destination station. For example, electronic messages may be sent from a source processor to a destination processor in a system of multiple computer processors connected by a network of switches and links.

In a communication network of switches and links, multiple paths may exist for sending an electronic message from a given source station to a selected destination station. The paths will have a variety of lengths. For a given length, there may be one or more different paths between the source processor and the destination processor having that length.

SUMMARY OF THE INVENTION

It is an object of the invention to provide a method of sending an electronic message from a source station through a network of a plurality of switches and links to a destination station along a path having a short length (for example, having a length less than or equal to the length of each other path from the source station to the destination station) and which efficiently utilizes the network.

It is another object of the invention to provide a method of assigning a communication route from a source station through a network of a plurality of switches and links to a destination station along a path having a short length (for example, having a length less than or equal to the length of each other path from the source station to the destination station) and which efficiently utilizes the network, According to the invention, a method of sending an electronic message from a source station through a network of a plurality of switches and links to a destination station comprises generating a series of one or more route signals. Each route signal identifies an output port of a switch in the network of switches, An electronic message is generated comprising the series of route signals. The message is sequentially sent to each of a series of one or more switches, Each switch reads a route signal in the message and sends the message to a switch or a station having an input port connected to an output port identified by the route signal.

The step of generating the series of route signals according the invention comprises the step of storing a weight $w_o^m$ for each switch link connecting an output port $o_m$ of a switch m to an input port of another switch. One or more candidate paths through the switch network starting at the source station and ending at initial candidate destinations are identified. Each initial candidate destination comprises a switch or a station having an input port directly connected to all output port of a switch having an input port directly connected to the source station. If one or more candidate destinations are the destination station, a candidate path ending at the destination station is selected, and a series of route signals corresponding to the selected candidate path is generated.

If no candidate destination is the destination station, one or more extended candidate paths through the switch network starting at the source station and ending at next candidate destinations are identified. Each next candidate destination comprises a switch or a station having an input port directly connected to output port of a prior candidate destination. Each extended candidate path has a path weight comprising the weights of switch links along the candidate path.

If one or more next candidate destinations are the destination station, a candidate path ending at the destination station and having a path weight better than or equal to the path weight of each other candidate path ending at the destination station is selected. A series of route signals corresponding to the selected candidate path is generated. If none of the candidate destinations are the destination station, the candidate paths are further extended in the manner described above until one or more candidate destinations are the destination station.

Each candidate path may comprise a series of one or more switches starting with the switch having all input port directly connected to the source station and ending with a switch having an output port directly connected to the candidate destination of the candidate path. Each candidate path may further comprise a station link connecting the source station to the input port of the starting switch, and a station link connecting the output port of the ending switch to the destination station.

Each extended candidate path may further comprise one or more switch links connecting an output port of a switch in the path with an input port of another switch in the path.

Each pair of extended candidate paths identified by the method according to the invention contain a common root path extending from the source station to a common branch switch from which the paths diverge. In one aspect of the invention, the path weight of a first candidate path is better than the path weight of a second candidate path if the weight of the switch link of the first candidate path connected to all output of the common branch switch for the first and second candidate paths is better than the weight of the switch link of the second candidate path connected to an output of the common branch switch for the first and second candidate paths.

The step of generating a series of route signals corresponding to the selected candidate path may comprise generating a series of route signals identifying switch output ports connected to the links forming the candidate path.

The step of storing weights for the switch links may comprise storing an initial value K for the weight $w_o^m$ for each switch link connected to an output port $o_m$ of a switch m, where K is a selected constant, For example, the initial weights K may be 0.

The step of selecting a candidate path ending at the destination station may further comprise changing (for example increasing) the weight $w_o^m$ of each switch link forming the selected candidate path The weight may be changed (for example increased) by a constant K'. For example, the constant K' may be +1.

When the weights of switch links forming a candidate path are increased on the selection of the candidate path, the path weight of a first candidate path is better than the path weight of a second candidate path if the weight of the switch link of the first candidate path connected to an output of the common branch switch for the first and second candidate paths is less than the weight of the switch link of the second candidate path connected to an output of the common branch switch for the first and second candidate paths.

In order to avoid regenerating route signals between a given source station and a selected destination station, the series of route signals may be stored in a route table. The message may then be generated by reading the series of route signals from the route table.

In one aspect of the invention, the destination station has an input port. The last route signal in the series of route signals in the message identifies a switch output port directly connected to the input port of the destination station.

According to the invention, the step of sequentially sending the message may comprise sending the message to a first switch having an input port directly connected to the source station, and having at least two output ports. A route signal in the message is read to identify all output port of the first switch. The message is then sent to a second switch having an input port directly connected to the output port of the first switch identified by the read route signal.

After reading the route signal, the method according to the present invention may further comprise the step of disabling the read route signal.

In an alternative embodiment of the invention, each extended candidate path has a path weight comprising the sum of the weights of switch links along the candidate path.

By assigning communication routes, and by sending electronic messages through a network of a plurality of switches and links along these assigned routes according to the invention, efficient utilization of the entire network of switches and links can be achieved.

DESCRIPTION OF THE PREFERRED EMBODIMENTS

Figure 1:
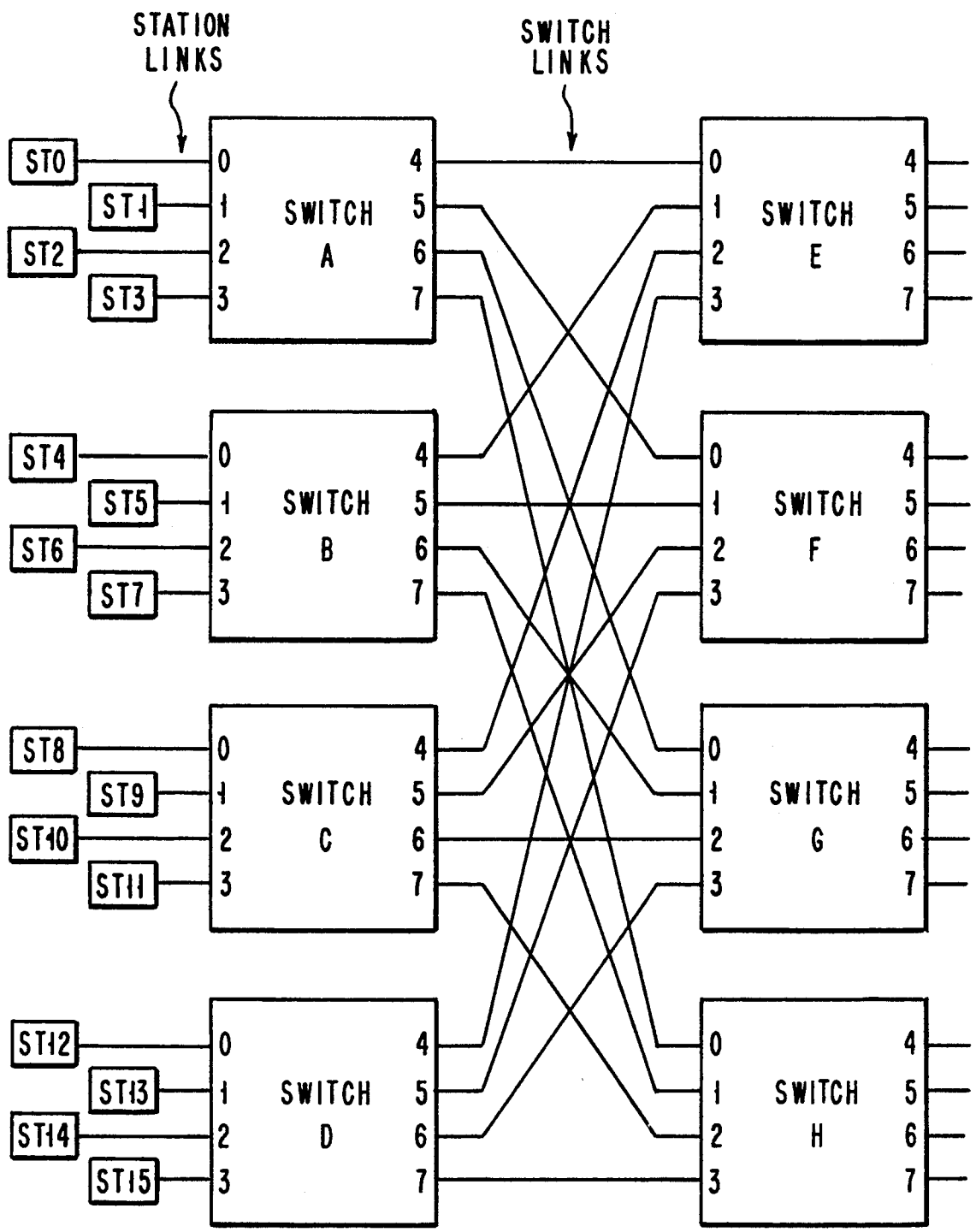
FIG. 1 is a block diagram of an example of a communication network for use in the method of sending electronic messages according to the invention.

FIG. 1 is a block diagram of an example of a communication network for use in the method of sending messages according to the invention. In this example, stations ST0 through ST15 represent both source stations for generating electronic messages and destination stations for receiving electronic messages. The stations ST0 through ST15 may be, for example, computer processor nodes containing computer processors, communication circuits for sending and receiving electronic messages, and ally necessary adapters between the computer processors and the communication circuits.

Figure 2:
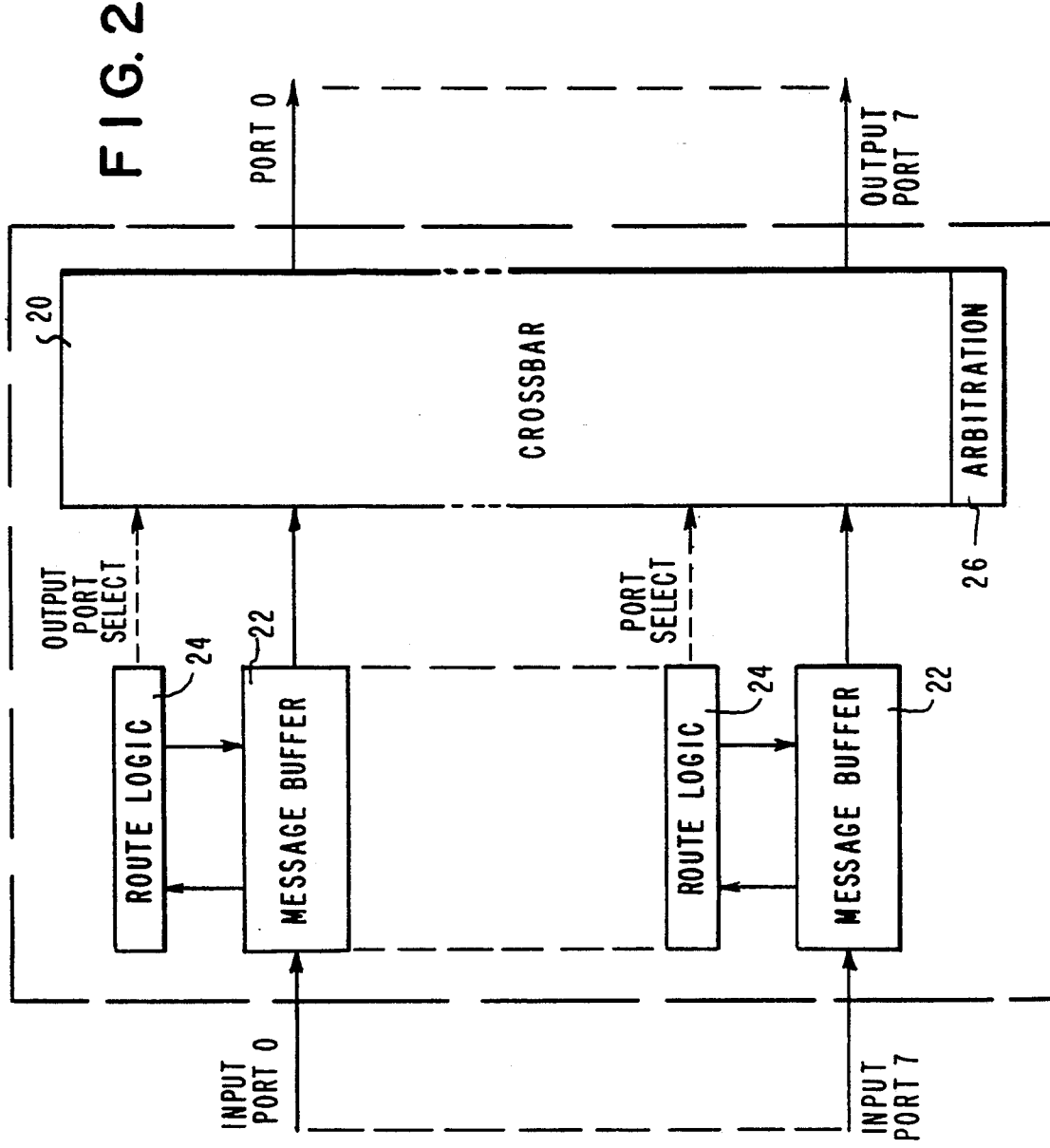
FIG. 2 is a block diagram of an example of a switch for use in the communication network of FIG. 1.

The communication network further comprises switches A through H. As shown in FIG. 2, each switch has eight input ports 0 through 7 and eight output ports 0 through 7. The input ports are switchably connected to the output ports by way of a crossbar 20 which can connect any input port to any output port. Each input port is connected to the crossbar 20 by way of a message buffer 22. A route logic circuit 24 reads a route signal from the message buffer 22 (in a manner further discussed below), and supplies an output port selection signal to the crossbar 20 to connect the input port to the desired output port. An arbitration circuit 26 resolves conflicts between two or more input ports contending for connection to the same output port.

Returning to FIG. 1, each station is connected to one input port of a switch by a station link, and is connected to one output port of a switch by a different station link. Thus, each line connecting a station to a switch in FIG. 1 schematically represents two station links forming a full duplex link between each station and its associated switch.

Similarly, each of switches A through D has an output port connected to an input port of each of switches E through H by way of a switch link. Each of switches A through D have an input port connected to an output port of each of switches E through H by way of different switch links. Consequently, each line connecting one of switches A through D with one of switches E through H schematically represents two switch links forming a full duplex communication channel.

Each link may comprise, for example, eight data lines, and one "tag" line to flag information on the data lines.

The topology of the communication network shown in FIG. 1 can be described by listing, for each switch, and for each pair of input and output ports of each switch, the station or switch which is connected thereto. Accordingly, the switch connection topology shown in FIG. 1 is described in Table 1.

TABLE 1

| SWITCH CONNECTION TOPOLOGY | | |
|---|---|---|
| Switch (m) | Input/ Output Port (o) | Station or Switch |
| A | 0 | ST0 |
| A | 1 | ST1 |
| A | 2 | ST2 |
| A | 3 | ST3 |
| A | 4 | E |
| A | 5 | F |
| A | 6 | G |
| A | 7 | H |
| B | 0 | ST4 |
| B | 1 | ST5 |
| B | 2 | ST6 |
| B | 3 | ST7 |
| B | 4 | E |
| B | 5 | F |
| B | 6 | G |
| B | 7 | H |
| C | 0 | ST8 |
| C | 1 | ST9 |
| C | 2 | ST10 |
| C | 3 | ST11 |
| C | 4 | E |
| C | 5 | F |
| C | 6 | G |
| C | 7 | H |
| D | 0 | ST12 |
| D | 1 | ST13 |
| D | 2 | ST14 |
| D | 3 | ST15 |
| D | 4 | E |
| D | 5 | F |
| D | 6 | G |
| D | 7 | H |
| E | 0 | A |
| E | 1 | B |
| E | 2 | C |
| E | 3 | D |
| E | 4 | NONE |

TABLE 1-continued

SWITCH CONNECTION TOPOLOGY

| Switch (m) | Input/ Output Port (o) | Station or Switch |
|---|---|---|
| E | 5 | NONE |
| E | 6 | NONE |
| F | 7 | NONE |
| F | 0 | A |
| F | 1 | B |
| F | 2 | C |
| F | 3 | D |
| F | 4 | NONE |
| F | 5 | NONE |
| F | 6 | NONE |
| F | 7 | NONE |
| G | 0 | A |
| G | 1 | B |
| G | 2 | C |
| G | 3 | D |
| G | 4 | NONE |
| G | 5 | NONE |
| G | 6 | NONE |
| G | 7 | NONE |
| H | 0 | A |
| H | 1 | B |
| H | 2 | C |
| H | 3 | D |
| H | 4 | NONE |
| H | 5 | NONE |
| H | 6 | NONE |
| H | 7 | NONE |

The switch connection topology of Table 1 can be obtained either manually by inspection, or automatically by starting at any point in the communication network and performing a network search.

An electronic message may be sent from a source station ST0 to ST15 through the network of switches A to H and links to a destination station ST0 to ST15 by generating a series of one or more route signals. Each route signal identifies an output port of a switch in the network of switches. An electronic message contains the series of route signals. The message is sequentially sent to each of a series of one or more switches. Each switch reads a route signal in the message and sends the message to a switch or a station having an input port connected to an output port identified by the route signal.

For example, the message is first sent to a first switch having an input port directly connected to the source station. The first switch has at least two output ports. In the example of FIG. 1, each switch has eight output ports.

The switch receiving the message reads a route signal in the message. The route signal identifies an output port of the switch. Thereafter, the switch sends the message to a second switch (or to the destination station) having an input port directly connected to the output port of the first switch identified by the read route signal.

Figure 3:
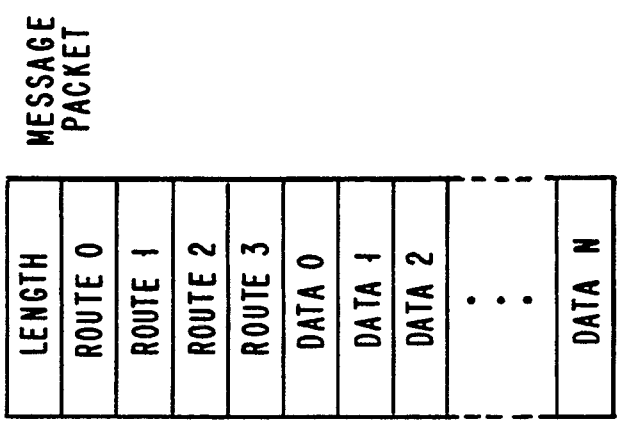
FIG. 3 schematically shows an example of an electronic message for use in the method according to the present invention.

FIG. 3 schematically shows an example of an electronic message for use in the method according to the invention. In this example, message packets may have variable lengths up to 255 bytes of eight binary digits (bits) per byte. The first byte of the packet contains the message length. Any number of following bytes in the packet contain route information. The message data follows the route information in the packet. In the example of FIG. 3, the message packet has four route bytes and N data bytes.

The switch receiving the message examines the first route byte of each message packet to determine the output port the packet is to be routed to. A route byte consists of a one-bit field selector (for example, bit 7) and two 3-bit route fields (for example bits 4–6 and bits 0–2). If the field selector bit is 0, for example, then the switch routes the message packet to the output port specified in the higher order route field, and changes the field selector bit to 1. If the field selector bit equals 1, then the switch routes the message packet to the output port specified in the lower order route field, discards the entire first route byte, and decreases the value of the contents of the length byte by one.

Thus, each route byte allows a packet to be routed through two switch chips. By concatenating R route bytes, each message packet call be routed through up to 2R stages of switches. A message packet has no route bytes left upon arriving at the destination station.

The series of route signals is generated, according to the present invention by storing a weight $w_o^m$ for each switch link connecting an output port $o_m$ of a switch m to an input port of another switch. Table 2 shows an example of initial switch link weights.

TABLE 2

INITIAL SWITCH LINK WEIGHTS

| Switch Link | | |
|---|---|---|
| Switch (m) | Output Port (o) | Weight w (o, m) |
| A | 4 | 0 |
| A | 5 | 0 |
| A | 6 | 0 |
| A | 7 | 0 |
| B | 4 | 0 |
| B | 5 | 0 |
| B | 6 | 0 |
| B | 7 | 0 |
| C | 4 | 0 |
| C | 5 | 0 |
| C | 6 | 0 |
| C | 7 | 0 |
| D | 4 | 0 |
| D | 5 | 0 |
| D | 6 | 0 |
| D | 7 | 0 |
| E | 0 | 0 |
| E | 1 | 0 |
| E | 2 | 0 |
| E | 3 | 0 |
| F | 0 | 0 |
| F | 1 | 0 |
| F | 2 | 0 |
| F | 3 | 0 |
| G | 0 | 0 |
| G | 1 | 0 |
| G | 2 | 0 |
| G | 3 | 0 |
| H | 0 | 0 |
| H | 1 | 0 |
| H | 2 | 0 |
| H | 3 | 0 |

In Table 2, each switch link is identified by the switch output port to which it is connected. For example, the switch link connecting switch A to switch E (see FIG. 1) is identified by its connection to output port 4 of switch A. The switch link connecting switch A to F is identified by its connection to output port 5 of switch A. The remaining switch links shown in FIG. 1 are similarly identified.

The step of storing weights for the switch links may comprise, for example, storing an initial value K for the weight $w_o^m$ for each switch link connected to an output port $o_m$ of a switch m, where K is a selected constant.

As shown in Table 2, all switch links in the network of FIG. 1 have an initial weight of K=0.

In order to generate the series of route signals according to the present invention, one or more candidate paths through the switch network starting at the source station and ending at initial candidate destinations are identified. Each initial candidate destination comprises a switch or a station having an input port directly connected to an output port of a switch having an input port directly connected to the source station.

Table 3 shows initial candidate paths starting at source station ST0 for the hypothetical communication network shown in FIG. 1.

TABLE 3

INITIAL CANDIDATE PATHS

| Source Station | Initial Candidate Path Link (weight) | Candidate Destination | Total Path Weight |
|---|---|---|---|
| ST0 | A0 | ST0 | 0 |
| ST0 | A1 | ST1 | 0 |
| ST0 | A2 | ST2 | 0 |
| ST0 | A3 | ST3 | 0 |
| ST0 | A4 (0) | E | 0 |
| ST0 | A5 (0) | F | 0 |
| ST0 | A6 (0) | G | 0 |
| ST0 | A7 (0) | H | 0 |

In the example of Table 3, the source station is station ST0. The initial candidate destinations are stations ST0, ST1, ST2, and ST3, each having an input port directly connected to an output port of switch A having all input port directly connected to the source station ST0. The initial candidate destinations also comprise switches E, F, G, and H, each having an input port directly connected to an output port of switch A. In Table 3, each initial candidate path is identified by the station link or switch link connected to the candidate destination. The number in parentheses adjacent each link identification is the weight of the link from Table 2.

Normally, a source station has no need to send a message to itself. In that case, the candidate destination ST0 would be omitted from Table 3.

If one or more candidate destinations are the destination station, then a candidate path ending at the destination station is selected, and a series of route signals corresponding to the selected candidate path is generated. Thus, in the example of Table 3 for the communication network shown in FIG. 1, the candidate paths identified by output ports 1, 2, and 3 of switch A are selected for the destination stations ST1, ST2, and ST3, respectively. A route signal identifying output port 1 of switch A is generated for the selected path to station ST1, a route signal identifying output port 2 of switch A is generated for the path to station ST2, and a route signal identifying output port 3 of switch A is generated for the path to station ST3.

If no candidate destination is the destination station, then one or more extended candidate paths through the switch network starting at the source station and ending at next candidate destinations are identified. Each next candidate destination comprises a switch or a station having an input port directly connected to an output port of a prior candidate destination. Each extended candidate path has a path weight comprising the weights of switch links along the candidate path, For destination stations ST4 through ST15 none of the candidate destinations of Table 3 are the destination stations. Consequently, Table 4 shows first extended candidate paths for the communication network shown in FIG. 1.

TABLE 4

FIRST EXTENDED CANDIDATE PATHS

| Source Station | First Extended Candidate Path Link (weight) | Link (weight) | Candidate Destination | Total Path Weight |
|---|---|---|---|---|
| ST0 | A0 | NONE | NONE | 0 |
| ST0 | A1 | NONE | NONE | 0 |
| ST0 | A2 | NONE | NONE | 0 |
| ST0 | A3 | NONE | NONE | 0 |
| ST0 | A4 (0) | E0 (0) | A | 0 |
| ST0 | A4 (0) | E1 (0) | B | 0 |
| ST0 | A4 (0) | E2 (0) | C | 0 |
| ST0 | A4 (0) | E3 (0) | D | 0 |
| ST0 | A5 (0) | F0 (0) | A | 0 |
| ST0 | A5 (0) | F1 (0) | B | 0 |
| ST0 | A5 (0) | F2 (0) | C | 0 |
| ST0 | A5 (0) | F3 (0) | D | 0 |
| ST0 | A6 (0) | G0 (0) | A | 0 |
| ST0 | A6 (0) | G1 (0) | B | 0 |
| ST0 | A6 (0) | G2 (0) | C | 0 |
| ST0 | A6 (0) | G3 (0) | D | 0 |
| ST0 | A7 (0) | H0 (0) | A | 0 |
| ST0 | A7 (0) | H1 (0) | B | 0 |
| ST0 | A7 (0) | H2 (0) | C | 0 |
| ST0 | A7 (0) | H3 (0) | D | 0 |

In Table 4, the source station remains station ST0. The next candidate destinations are switches A, B, C, and D, each having an input port directly connected to an output port of prior candidate destination switches E, F, G, and H. Since the prior candidate destinations stations ST0, ST1, ST2, and ST3 are not switches, extended candidate paths are normally not obtained from these prior candidate destinations.

Each extended candidate path of Table 4 has a path weight comprising the weights of switch links along the candidate path. Thus, the path weight for the extended candidate path A4/E1 comprises the weight of the switch link A4 (connecting output port A4 to input port E0).

In the method of generating the series of route signals according to the present invention, if one or more of the next candidate destinations are the destination station, a candidate path ending at the destination station and having a path weight which is better than or equal to the path weight of each other candidate path ending at the destination station is selected. A series of route signals corresponding to the selected candidate path is generated. Otherwise, the candidate paths are further extended in the manner described above.

In Table 4, none of the candidate destinations are the destination stations ST4 through ST15. Consequently, Table 5 shows second extended candidate paths for the communication network shown in FIG. 1.

TABLE 5

SECOND EXTENDED CANDIDATE PATHS

| Source Station | Second Extended Candidate Paths Link (weight) | Link (weight) | Link (weight) | Candidate Destination | Total Path Weight |
|---|---|---|---|---|---|
| ST0 | A0 | NONE | NONE | NONE | 0 |
| ST0 | A1 | NONE | NONE | NONE | 0 |
| ST0 | A2 | NONE | NONE | NONE | 0 |
| ST0 | A3 | NONE | NONE | NONE | 0 |
| ST0 | A4 (0) | E0 (0) | A0 | ST0 | 0 |
| ST0 | A4 (0) | E0 (0) | A1 | ST1 | 0 |
| ST0 | A4 (0) | E0 (0) | A2 | ST2 | 0 |

TABLE 5-continued

SECOND EXTENDED CANDIDATE PATHS

| Source Station | Link (weight) | Link (weight) | Link (weight) | Candidate Destination | Total Path Weight |
|---|---|---|---|---|---|
| ST0 | A4 (0) | E0 (0) | A3 | ST3 | 0 |
| ST0 | A4 (0) | E0 (0) | A4 (0) | E | 0 |
| ST0 | A4 (0) | E0 (0) | A5 (0) | F | 0 |
| ST0 | A4 (0) | E0 (0) | A6 (0) | G | 0 |
| ST0 | A4 (0) | E0 (0) | A7 (0) | H | 0 |
| ST0 | A4 (0) | E1 (0) | B0 | ST4 | 0 |
| ST0 | A4 (0) | E1 (0) | B1 | ST5 | 0 |
| ST0 | A4 (0) | E1 (0) | B2 | ST6 | 0 |
| ST0 | A4 (0) | E1 (0) | B3 | ST7 | 0 |
| ST0 | A4 (0) | E1 (0) | B4 (0) | E | 0 |
| ST0 | A4 (0) | E1 (0) | B5 (0) | F | 0 |
| ST0 | A4 (0) | E1 (0) | B6 (0) | G | 0 |
| ST0 | A4 (0) | E1 (0) | B7 (0) | H | 0 |
| ST0 | A4 (0) | E2 (0) | C0 | ST8 | 0 |
| ST0 | A4 (0) | E2 (0) | C1 | ST9 | 0 |
| ST0 | A4 (0) | E2 (0) | C2 | ST10 | 0 |
| ST0 | A4 (0) | E2 (0) | C3 | ST11 | 0 |
| ST0 | A4 (0) | E2 (0) | C4 (0) | E | 0 |
| ST0 | A4 (0) | E2 (0) | C5 (0) | F | 0 |
| ST0 | A4 (0) | E2 (0) | C6 (0) | G | 0 |
| ST0 | A4 (0) | E2 (0) | C7 (0) | H | 0 |
| ST0 | A4 (0) | E3 (0) | D0 | ST12 | 0 |
| ST0 | A4 (0) | E3 (0) | D1 | ST13 | 0 |
| ST0 | A4 (0) | E3 (0) | D2 | ST14 | 0 |
| ST0 | A4 (0) | E3 (0) | D3 | ST15 | 0 |
| ST0 | A4 (0) | E3 (0) | D4 | E | 0 |
| ST0 | A4 (0) | E3 (0) | D5 (0) | F | 0 |
| ST0 | A4 (0) | E3 (0) | D6 (0) | G | 0 |
| ST0 | A4 (0) | E3 (0) | D7 (0) | H | 0 |
| ST0 | A5 (0) | F0 (0) | A0 | ST0 | 0 |
| ST0 | A5 (0) | F0 (0) | A1 | ST1 | 0 |
| ST0 | A5 (0) | F0 (0) | A2 | ST2 | 0 |
| ST0 | A5 (0) | F0 (0) | A3 | ST3 | 0 |
| ST0 | A5 (0) | F0 (0) | A4 (0) | E | 0 |
| ST0 | A5 (0) | F0 (0) | A5 (0) | F | 0 |
| ST0 | A5 (0) | F0 (0) | A6 (0) | G | 0 |
| ST0 | A5 (0) | F0 (0) | A7 (0) | H | 0 |
| ST0 | A5 (0) | F1 (0) | B0 | ST4 | 0 |
| ST0 | A5 (0) | F1 (0) | B1 | ST5 | 0 |
| ST0 | A5 (0) | F1 (0) | B2 | ST6 | 0 |
| ST0 | A5 (0) | F1 (0) | B3 | ST7 | 0 |
| ST0 | A5 (0) | F1 (0) | B4 (0) | E | 0 |
| ST0 | A5 (0) | F1 (0) | B5 (0) | F | 0 |
| ST0 | A5 (0) | F1 (0) | B6 (0) | G | 0 |
| ST0 | A5 (0) | F1 (0) | B7 (0) | H | 0 |
| ST0 | A5 (0) | F2 (0) | C0 | ST8 | 0 |
| ST0 | A5 (0) | F2 (0) | C1 | ST9 | 0 |
| ST0 | A5 (0) | F2 (0) | C2 | ST10 | 0 |
| ST0 | A5 (0) | F2 (0) | C3 | ST11 | 0 |
| ST0 | A5 (0) | F2 (0) | C4 (0) | E | 0 |
| ST0 | A5 (0) | F2 (0) | C5 (0) | F | 0 |
| ST0 | A5 (0) | F2 (0) | C6 (0) | G | 0 |
| ST0 | A5 (0) | F2 (0) | C7 (0) | H | 0 |
| ST0 | A5 (0) | F3 (0) | D0 | ST12 | 0 |
| ST0 | A5 (0) | F3 (0) | D1 | ST13 | 0 |
| ST0 | A5 (0) | F3 (0) | D2 | ST14 | 0 |
| ST0 | A5 (0) | F3 (0) | D3 | ST15 | 0 |
| ST0 | A5 (0) | F3 (0) | D4 (0) | E | 0 |
| ST0 | A5 (0) | F3 (0) | D5 (0) | F | 0 |
| ST0 | A5 (0) | F3 (0) | D6 (0) | G | 0 |
| ST0 | A5 (0) | F3 (0) | D7 (0) | H | 0 |
| ST0 | A6 (0) | G0 (0) | A0 | ST0 | 0 |
| ST0 | A6 (0) | G0 (0) | A1 | ST1 | 0 |
| ST0 | A6 (0) | G0 (0) | A2 | ST2 | 0 |
| ST0 | A6 (0) | G0 (0) | A3 | ST3 | 0 |
| ST0 | A6 (0) | G0 (0) | A4 (0) | E | 0 |
| ST0 | A6 (0) | G0 (0) | A5 (0) | F | 0 |
| ST0 | A6 (0) | G0 (0) | A6 (0) | G | 0 |
| ST0 | A6 (0) | G0 (0) | A7 (0) | H | 0 |
| ST0 | A6 (0) | G1 (0) | B0 | ST4 | 0 |
| ST0 | A6 (0) | G1 (0) | B1 | ST5 | 0 |
| ST0 | A6 (0) | G1 (0) | B2 | ST6 | 0 |
| ST0 | A6 (0) | G1 (0) | B3 | ST7 | 0 |
| ST0 | A6 (0) | G1 (0) | B4 (0) | E | 0 |
| ST0 | A6 (0) | G1 (0) | B5 (0) | F | 0 |
| ST0 | A6 (0) | G1 (0) | B6 (0) | G | 0 |
| ST0 | A6 (0) | G1 (0) | B7 (0) | H | 0 |
| ST0 | A6 (0) | G2 (0) | C0 | ST8 | 0 |
| ST0 | A6 (0) | G2 (0) | C1 | ST9 | 0 |
| ST0 | A6 (0) | G2 (0) | C2 | ST10 | 0 |
| ST0 | A6 (0) | G2 (0) | C3 | ST11 | 0 |
| ST0 | A6 (0) | G2 (0) | C4 (0) | E | 0 |
| ST0 | A6 (0) | G2 (0) | C5 (0) | F | 0 |
| ST0 | A6 (0) | G2 (0) | C6 (0) | G | 0 |
| ST0 | A6 (0) | G2 (0) | C7 (0) | H | 0 |
| ST0 | A6 (0) | G3 (0) | D0 | ST12 | 0 |
| ST0 | A6 (0) | G3 (0) | D1 | ST13 | 0 |
| ST0 | A6 (0) | G3 (0) | D2 | ST14 | 0 |
| ST0 | A6 (0) | G3 (0) | D3 | ST15 | 0 |
| ST0 | A6 (0) | G3 (0) | D4 (0) | E | 0 |
| ST0 | A6 (0) | G3 (0) | D5 (0) | F | 0 |
| ST0 | A6 (0) | G3 (0) | D6 (0) | G | 0 |
| ST0 | A6 (0) | G3 (0) | D7 (0) | H | 0 |
| ST0 | A7 (0) | H0 (0) | A0 | ST0 | 0 |
| ST0 | A7 (0) | H0 (0) | A1 | ST1 | 0 |
| ST0 | A7 (0) | H0 (0) | A2 | ST2 | 0 |
| ST0 | A7 (0) | H0 (0) | A3 | ST3 | 0 |
| ST0 | A7 (0) | H0 (0) | A4 (0) | E | 0 |
| ST0 | A7 (0) | H0 (0) | A5 (0) | F | 0 |
| ST0 | A7 (0) | H0 (0) | A6 (0) | G | 0 |
| ST0 | A7 (0) | H0 (0) | A7 (0) | H | 0 |
| ST0 | A7 (0) | H1 (0) | B0 | ST4 | 0 |
| ST0 | A7 (0) | H1 (0) | B1 | ST5 | 0 |
| ST0 | A7 (0) | H1 (0) | B2 | ST6 | 0 |
| ST0 | A7 (0) | H1 (0) | B3 | ST7 | 0 |
| ST0 | A7 (0) | H1 (0) | B4 (0) | E | 0 |
| ST0 | A7 (0) | H1 (0) | B5 (0) | F | 0 |
| ST0 | A7 (0) | H1 (0) | B6 (0) | G | 0 |
| ST0 | A7 (0) | H1 (0) | B7 (0) | H | 0 |
| ST0 | A7 (0) | H2 (0) | C0 | ST8 | 0 |
| ST0 | A7 (0) | H2 (0) | C1 | ST9 | 0 |
| ST0 | A7 (0) | H2 (0) | C2 | ST10 | 0 |
| ST0 | A7 (0) | H2 (0) | C3 | ST11 | 0 |
| ST0 | A7 (0) | H2 (0) | C4 (0) | E | 0 |
| ST0 | A7 (0) | H2 (0) | C5 (0) | F | 0 |
| ST0 | A7 (0) | H2 (0) | C6 (0) | G | 0 |
| ST0 | A7 (0) | H2 (0) | C7 (0) | H | 0 |
| ST0 | A7 (0) | H3 (0) | D0 | ST12 | 0 |
| ST0 | A7 (0) | H3 (0) | D1 | ST13 | 0 |
| ST0 | A7 (0) | H3 (0) | D2 | ST14 | 0 |
| ST0 | A7 (0) | H3 (0) | D3 | ST15 | 0 |
| ST0 | A7 (0) | H3 (0) | D4 (0) | E | 0 |
| ST0 | A7 (0) | H3 (0) | D5 (0) | F | 0 |
| ST0 | A7 (0) | H3 (0) | D6 (0) | G | 0 |
| ST0 | A7 (0) | H3 (0) | D7 (0) | H | 0 |

In Table 5, the source station remains station ST0. The next candidate destinations are switches E, F, G, and H, and stations ST0 through ST15. Each next candidate destination switch or station has an input port directly connected to an output port of the prior candidate destinations shown in Table 4.

Each extended candidate path of Table 5 has a path weight comprising the weights of the switch links along the candidate path. Thus, the path weight for the extended candidate path A4/E1/B0 comprises the weight of the switch link A4 (connecting output port A4 to input port E0), and the weight of the switch link E1 (connecting output port E1 to input port B4).

For the destination station ST4, there are four candidate paths ending at the destination station. These candidate paths are identified by the series of output ports A4/E1/B0, A5/F1/B0, A6/G1/B0, and A7/H1/B0.

In one embodiment of the method according to the invention, each pair of extended candidate paths contain a common root path extending from the source station to a common branch switch from which the paths diverge. The path weight of a first candidate path is better than the path weight of a second candidate path if the weight of the switch link of the first candidate path connected to an output of the common branch switch for the first and second candidate paths is better than (for example, less than) the weight of the switch link of the second candidate path connected to an output of the common branch switch for the first and second candidate paths.

Thus, for candidate paths A4/E1/B0 and AS/F1/B0, the common root path extends from the source station ST0 to the branch switch A. The path weight of the candidate path A4/E1/B0 is the weight of switch link A4 (w=0) and the path weight of the candidate path A5/F1/B0 is the weight of switch link A5 (w=0), both connected to outputs of the common branch switch. Since both of these candidate paths have path weights of 0, either one may be selected as being better. In this example, the candidate path A4/E1/B0 is selected.

Similarly, for candidate paths A4/E1/B0 and A6/G1/B0, the common root path extends from the source station ST0 to the branch switch A. The path weight of the candidate path A4/E1/B0 is the weight of switch link A4 (w=0) and the path weight of the candidate path A6/G1/B0 is the weight of switch link A6 (w=0), both connected to outputs of the common branch switch. Since both of these candidate paths have path weights of 0, either one may be selected as being better. In this example, the candidate path A4/E1/B0 is again selected.

Finally, for candidate paths A4/E1/B0 and A7/H1/B0, the common root path extends from the source station ST0 to the branch switch A. The path weight of the candidate path A4/E1/B0 is the weight of switch link A4 (w=0), and the path weight of the candidate path A7/H1/B0 is the weight of switch link A7 (w=0), both connected to outputs of the common branch switch. Since both of these candidate paths have path weights of 0, either one may be selected as being better. In this example, the candidate path A4/E1/B0 is again selected, and a series of route signals corresponding to the selected candidate path A4/E1/B0 is generated.

Alternatively, each extended candidate path could have a path weight comprising the sum of the weights of the switch links along the candidate path. In this alternative, the path weight of path A4/E1/B1 would be the sum of the weights of switch link A4 and switch link E1 resulting in a path weight of 0.

As shown in Tables 3, 4, and 5, and FIG. 1, each candidate path comprises a series of one or more switches starting with the switch having an input port directly connected to the source station and ending with a switch having an output port directly connected to the candidate destination of the candidate path. Each candidate path further comprises a station link connecting the source station to an input port of the starting switch, and a station link connecting the output port of the ending switch to the destination station. Each extended candidate path further comprises one or more switch links connecting an output port of a switch in the path with an input port of another switch in the path.

For the destination station ST4, the route signals corresponding to the selected path comprise a series of route signals identifying the switch output ports A4, E1, and B0 connected to the switch links and station links forming the candidate path.

According to the invention, the step of selecting a candidate path ending at the destination station may further comprise changing the weight $w_o^m$ of each switch link forming the selected candidate path. For example, the step of changing the weights of the switch links forming the selected candidate path may comprise increasing the weight of each switch link forming the selected candidate path by a constant $K'$ For example $K'$ may be equal to $+1$.

Table 6 shows a hypothetical example of revised switch link weights obtained after selecting the path A4/E1/B0 for source station ST0 and for destination station ST4.

TABLE 6

REVISED SWITCH LINK WEIGHTS

| Switch Link | | |
|---|---|---|
| Switch (m) | Output Port (o) | Weight w (o,m) |
| A | 4 | 1 |
| A | 5 | 0 |
| A | 6 | 0 |
| A | 7 | 0 |
| B | 4 | 0 |
| B | 5 | 0 |
| B | 6 | 0 |
| B | 7 | 0 |
| C | 4 | 0 |
| C | 5 | 0 |
| C | 6 | 0 |
| C | 7 | 0 |
| D | 4 | 0 |
| D | 5 | 0 |
| D | 6 | 0 |
| D | 7 | 0 |
| E | 0 | 0 |
| E | 1 | 1 |
| E | 2 | 0 |
| E | 3 | 0 |
| F | 0 | 0 |
| F | 1 | 0 |
| F | 2 | 0 |
| F | 3 | 0 |
| G | 0 | 0 |
| G | 1 | 0 |
| G | 2 | 0 |
| G | 3 | 0 |
| H | 0 | 0 |
| H | 1 | 0 |
| H | 2 | 0 |
| H | 3 | 0 |

In this example, the weights of the switch links connected to output port 4 of switch A, and output port 1 of switch E have been increased to 1. The weights of the switch links which are not contained in the selected path remain at 0.

Thus far, paths have been selected to stations ST0, ST1, ST2, ST3, and ST4. Table 7 shows the second extended candidate paths for destination stations ST5 through ST15 with revised path weights according to Table 6.

TABLE 7

SECOND EXTENDED CANDIDATE PATHS WITH REVISED WEIGHTS

| Source Station | Second Extended Candidate Paths | | | Candidate Destination | Total Path Weight |
|---|---|---|---|---|---|
| | Link (weight) | Link (weight) | Link (weight) | | |
| ST0 | A0 | NONE | NONE | NONE | 0 |
| ST0 | A1 | NONE | NONE | NONE | 0 |
| ST0 | A2 | NONE | NONE | NONE | 0 |
| ST0 | A3 | NONE | NONE | NONE | 0 |
| ST0 | A4 (1) | E0 (0) | A0 | ST0 | 1 |

TABLE 7-continued

SECOND EXTENDED CANDIDATE PATHS WITH REVISED WEIGHTS

| Source Station | Second Extended Candidate Paths | | | Candidate Destination | Total Path Weight |
|---|---|---|---|---|---|
| | Link (weight) | Link (weight) | Link (weight) | | |
| ST0 | A4 (1) | E0 (0) | A1 | ST1 | 1 |
| ST0 | A4 (1) | E0 (0) | A2 | ST2 | 1 |
| ST0 | A4 (1) | E0 (0) | A3 | ST3 | 1 |
| ST0 | A4 (1) | E0 (0) | A4 (1) | E | 2 |
| ST0 | A4 (1) | E0 (0) | A5 (0) | F | 1 |
| ST0 | A4 (1) | E0 (0) | A6 (0) | G | 1 |
| ST0 | A4 (1) | E0 (0) | A7 (0) | H | 1 |
| ST0 | A4 (1) | E1 (1) | B0 | ST4 | 2 |
| ST0 | A4 (1) | E1 (1) | B1 | ST5 | 2 |
| ST0 | A4 (1) | E1 (1) | B2 | ST6 | 2 |
| ST0 | A4 (1) | E1 (1) | B3 | ST7 | 2 |
| ST0 | A4 (1) | E1 (1) | B4 (0) | E | 2 |
| ST0 | A4 (1) | E1 (1) | B5 (0) | F | 2 |
| ST0 | A4 (1) | E1 (1) | B6 (0) | G | 2 |
| ST0 | A4 (1) | E1 (1) | B7 (0) | H | 2 |
| ST0 | A4 (1) | E2 (0) | C0 | ST8 | 0 |
| ST0 | A4 (1) | E2 (0) | C1 | ST9 | 0 |
| ST0 | A4 (1) | E2 (0) | C2 | ST10 | 1 |
| ST0 | A4 (1) | E2 (0) | C3 | ST11 | 1 |
| ST0 | A4 (1) | E2 (0) | C4 (0) | E | 1 |
| ST0 | A4 (1) | E2 (0) | C5 (0) | F | 1 |
| ST0 | A4 (1) | E2 (0) | C6 (0) | G | 1 |
| ST0 | A4 (1) | E2 (0) | C7 (0) | H | 1 |
| ST0 | A4 (1) | E3 (0) | D0 | ST12 | 1 |
| ST0 | A4 (1) | E3 (0) | D1 | ST13 | 1 |
| ST0 | A4 (1) | E3 (0) | D2 | ST14 | 1 |
| ST0 | A4 (1) | E3 (0) | D3 | ST15 | 1 |
| ST0 | A4 (1) | E3 (0) | D4 (0) | E | 1 |
| ST0 | A4 (1) | E3 (0) | D5 (0) | F | 1 |
| ST0 | A4 (1) | E3 (0) | D6 (0) | G | 1 |
| ST0 | A4 (1) | E3 (0) | D7 (0) | H | 1 |
| ST0 | A5 (0) | F0 (0) | A0 | ST0 | 0 |
| ST0 | A5 (0) | F0 (0) | A1 | ST1 | 0 |
| ST0 | A5 (0) | F0 (0) | A2 | ST2 | 0 |
| ST0 | A5 (0) | F0 (0) | A3 | ST3 | 0 |
| ST0 | A5 (0) | F0 (0) | A4 (1) | E | 1 |
| ST0 | A5 (0) | F0 (0) | A5 (0) | F | 0 |
| ST0 | A5 (0) | F0 (0) | A6 (0) | G | 0 |
| ST0 | A5 (0) | F0 (0) | A7 (0) | H | 0 |
| ST0 | A5 (0) | F1 (0) | B0 | ST4 | 0 |
| ST0 | A5 (0) | F1 (0) | B1 | ST5 | 0 |
| ST0 | A5 (0) | F1 (0) | B2 | ST6 | 0 |
| ST0 | A5 (0) | F1 (0) | B3 | ST7 | 0 |
| ST0 | A5 (0) | F1 (0) | B4 (0) | E | 0 |
| ST0 | A5 (0) | F1 (0) | B5 (0) | F | 0 |
| ST0 | A5 (0) | F1 (0) | B6 (0) | G | 0 |
| ST0 | A5 (0) | F1 (0) | B7 (0) | H | 0 |
| ST0 | A5 (0) | F2 (0) | C0 | ST8 | 0 |
| ST0 | A5 (0) | F2 (0) | C1 | ST9 | 0 |
| ST0 | A5 (0) | F2 (0) | C2 | ST10 | 0 |
| ST0 | A5 (0) | F2 (0) | C3 | ST11 | 0 |
| ST0 | A5 (0) | F2 (0) | C4 (0) | E | 0 |
| ST0 | A5 (0) | F2 (0) | C5 (0) | F | 0 |
| ST0 | A5 (0) | F2 (0) | C6 (0) | G | 0 |
| ST0 | A5 (0) | F2 (0) | C7 (0) | H | 0 |
| ST0 | A5 (0) | F3 (0) | D0 | ST12 | 0 |
| ST0 | A5 (0) | F3 (0) | D1 | ST13 | 0 |
| ST0 | A5 (0) | F3 (0) | D2 | ST14 | 0 |
| ST0 | A5 (0) | F3 (0) | D3 | ST15 | 0 |
| ST0 | A5 (0) | F3 (0) | D4 (0) | E | 0 |
| ST0 | A5 (0) | F3 (0) | D5 (0) | F | 0 |
| ST0 | A5 (0) | F3 (0) | D6 (0) | G | 0 |
| ST0 | A5 (0) | F3 (0) | D7 (0) | H | 0 |
| ST0 | A6 (0) | G0 (0) | A0 | ST0 | 0 |
| ST0 | A6 (0) | G0 (0) | A1 | ST1 | 0 |
| ST0 | A6 (0) | G0 (0) | A2 | ST2 | 0 |
| ST0 | A6 (0) | G0 (0) | A3 | ST3 | 0 |
| ST0 | A6 (0) | G0 (0) | A4 (1) | E | 1 |
| ST0 | A6 (0) | G0 (0) | A5 (0) | F | 0 |
| ST0 | A6 (0) | G0 (0) | A6 (0) | G | 0 |
| ST0 | A6 (0) | G0 (0) | A7 (0) | H | 0 |
| ST0 | A6 (0) | G1 (0) | B0 | ST4 | 0 |
| ST0 | A6 (0) | G1 (0) | B1 | ST5 | 0 |
| ST0 | A6 (0) | G1 (0) | B2 | ST6 | 0 |
| ST0 | A6 (0) | G1 (0) | B3 | ST7 | 0 |
| ST0 | A6 (0) | G1 (0) | B4 (0) | E | 0 |
| ST0 | A6 (0) | G1 (0) | B5 (0) | F | 0 |
| ST0 | A6 (0) | G1 (0) | BG (0) | G | 0 |
| ST0 | A6 (0) | G1 (0) | B7 (0) | H | 0 |
| ST0 | A6 (0) | G2 (0) | C0 | ST8 | 0 |
| ST0 | A6 (0) | G2 (0) | C1 | ST9 | 0 |
| ST0 | A6 (0) | G2 (0) | C2 | ST10 | 0 |
| ST0 | A6 (0) | G2 (0) | C3 | ST11 | 0 |
| ST0 | A6 (0) | G2 (0) | C4 (0) | E | 0 |
| ST0 | A6 (0) | G2 (0) | C5 (0) | F | 0 |
| ST0 | A6 (0) | G2 (0) | C6 (0) | G | 0 |
| ST0 | A6 (0) | G2 (0) | C7 (0) | H | 0 |
| ST0 | A6 (0) | G3 (0) | D0 | ST12 | 0 |
| ST0 | A6 (0) | G3 (0) | D1 | ST13 | 0 |
| ST0 | A6 (0) | G3 (0) | D2 | ST14 | 0 |
| ST0 | A6 (0) | G3 (0) | D3 | ST15 | 0 |
| ST0 | A6 (0) | G3 (0) | D4 (0) | E | 0 |
| ST0 | A6 (0) | G3 (0) | D5 (0) | F | 0 |
| ST0 | A6 (0) | G3 (0) | D6 (0) | G | 0 |
| ST0 | A6 (0) | G3 (0) | D7 (0) | H | 0 |
| ST0 | A7 (0) | H0 (0) | A0 | ST0 | 0 |
| ST0 | A7 (0) | H0 (0) | A1 | ST1 | 0 |
| ST0 | A7 (0) | H0 (0) | A2 | ST2 | 0 |
| ST0 | A7 (0) | H0 (0) | A3 | ST3 | 0 |
| ST0 | A7 (0) | H0 (0) | A4 (1) | E | 1 |
| ST0 | A7 (0) | H0 (0) | A5 (0) | F | 0 |
| ST0 | A7 (0) | H0 (0) | A6 (0) | G | 0 |
| ST0 | A7 (0) | H0 (0) | A7 (0) | H | 0 |
| ST0 | A7 (0) | H1 (0) | B0 | ST4 | 0 |
| ST0 | A7 (0) | H1 (0) | B1 | ST5 | 0 |
| ST0 | A7 (0) | H1 (0) | B2 | ST6 | 0 |
| ST0 | A7 (0) | H1 (0) | B3 | ST7 | 0 |
| ST0 | A7 (0) | H1 (0) | B4 (0) | E | 0 |
| ST0 | A7 (0) | H1 (0) | B5 (0) | F | 0 |
| ST0 | A7 (0) | H1 (0) | B6 (0) | G | 0 |
| ST0 | A7 (0) | H1 (0) | B7 (0) | H | 0 |
| ST0 | A7 (0) | H2 (0) | C0 | ST8 | 0 |
| ST0 | A7 (0) | H2 (0) | C1 | ST9 | 0 |
| ST0 | A7 (0) | H2 (0) | C2 | ST10 | 0 |
| ST0 | A7 (0) | H2 (0) | C3 | ST11 | 0 |
| ST0 | A7 (0) | H2 (0) | C4 (0) | E | 0 |
| ST0 | A7 (0) | H2 (0) | C5 (0) | F | 0 |
| ST0 | A7 (0) | H2 (0) | C6 (0) | G | 0 |
| ST0 | A7 (0) | H2 (0) | C7 (0) | H | 0 |
| ST0 | A7 (0) | H3 (0) | D0 | ST12 | 0 |
| ST0 | A7 (0) | H3 (0) | D1 | ST13 | 0 |
| ST0 | A7 (0) | H3 (0) | D2 | ST14 | 0 |
| ST0 | A7 (0) | H3 (0) | D3 | ST15 | 0 |
| ST0 | A7 (0) | H3 (0) | D4 (0) | E | 0 |
| ST0 | A7 (0) | H3 (0) | D5 (0) | F | 0 |
| ST0 | A7 (0) | H3 (0) | D6 (0) | G | 0 |
| ST0 | A7 (0) | H3 (0) | D7 (0) | H | 0 |

In Table 7 each extended candidate path has a path weight comprising the weights of the switch links along the candidate path.

For station ST5, there are four candidate paths ending at destination station ST5. These candidate paths are identified by the switch output ports A4/E1/B1, A5/F1/B1, A6/G1/B1, and A7/H1/B1.

In one embodiment of the method according to the invention, each pair of extended candidate paths contain a common root path extending from the source station to a common branch switch from which the paths diverge. The path weight of a first candidate path is better than the path weight of a second candidate path if the weight of the switch link of the first candidate path connected to an output of the common branch switch for the first and second candidate paths is better than (for example, less than) the weight of the switch link of the second candidate path connected to an output of the common branch switch for the first and second candidate paths.

Thus, for candidate paths A4/E1/B1 and A5/F1/B1, the common root path extends from the source station ST0 to the branch switch A. The path weight of the candidate path A4/E1/B1 is the weight of switch link A4 (w=1), and the path weight of the candidate path A5/F1/B1 is the weight of switch link A5 (w=0), both connected to outputs of the common branch switch. (See FIG. 6.) Since path A5/F1/B1 has a better (in this case lower) path weight than path A4/E1/B1, the candidate path A5/F1/B1 is selected.

Similarly, for candidate paths A5/F1/B1 and A6/G1/B1, the common root path extends from the source station ST0 to the branch switch A. The path weight of the candidate path A5/F1/B1 is the weight of switch link A5 (w=0) and the path weight of the candidate path A6/G1/B1 is the weight of switch link A6 (w=0), both connected to outputs of the common branch switch. Since both of these candidate paths have path weights of 0, either one may be selected as being better. In this example, the candidate path A5/F1/B1 is again selected.

Finally, for candidate paths A5/F1/B1 and A7/H1/B1, the common root path extends from the source station ST0 to the branch switch A. The path weight of the candidate path A5/F1/B1 is the weight of switch link A5 (w=0), and the path weight of the candidate path A7/H1/B1 is the weight of switch link A7 (w=0), both connected to outputs of the common branch switch. Since both of these candidate paths have path weights of 0, either one may be selected as being better. In this example, the candidate path A5/F1/B1 is again selected, and a series of route signals corresponding to the selected candidate path A5/F1/B1 is generated.

Alternatively, each extended candidate path could have a path weight comprising the sum of the weights of the switch links along the candidate path. In this alternative, the path weight of path A4/E1/B1 would be the sum of the weights of switch link A4 and switch link E1 resulting in a path weight of 2. The weights of paths A5/F1/B1, A6/G1/B1, and A7/H1/B1 in this alternative would be zero.

In the example above, some candidate destinations were revisited several times along different paths. In a preferred embodiment of the invention, however, when one or more candidate paths ending at a candidate destination are identified, only the candidate path having the best path weight is extended. No other paths to that candidate destination are further explored.

It is also preferred to extend candidate paths in an order from best to worst. When extending candidate paths in this order, as soon as a destination station is found, the candidate path to that destination station is selected, and a corresponding series of route signals is generated.

The method of generating the series of route signals according to the present invention may further comprise storing the series of route signals in a route table, and generating the electronic message by reading the series of route signals from the route table.

Table 8 shows a hypothetical example of a route table generated by the method according to the present invention.

TABLE 8

Route Table

| Source | Destination | | | | | | | |
|--------|-----|-----|-----|-----|-----|-----|-----|------|
|        | ST0 | ST1 | ST2 | ST3 | ST4 | ST5 | ... | ST15 |
| ST0    | —   | A1  | A2  | A3  | A4/E1/B0 | A5/F1/B1 | | |
| ST1    |     | —   |     |     |     |     |     |      |
| ST2    |     |     | —   |     |     |     |     |      |
| ST3    |     |     |     | —   |     |     |     |      |
| ST4    |     |     |     |     | —   |     |     |      |
| ST5    |     |     |     |     |     | —   |     |      |
| ST6    |     |     |     |     |     |     |     |      |
| ST7    |     |     |     |     |     |     |     |      |
| ST8    |     |     |     |     |     |     |     |      |
| ST9    |     |     |     |     |     |     |     |      |
| ST10   |     |     |     |     |     |     |     |      |
| ST11   |     |     |     |     |     |     |     |      |
| ST12   |     |     |     |     |     |     |     |      |
| ST13   |     |     |     |     |     |     |     |      |
| ST14   |     |     |     |     |     |     |     |      |
| ST15   |     |     |     |     |     | ... |     | —    |

In Table 8, the route table contains a route signal for each source station and each destination station. Each route signal identifies switch output ports connected to the links in the communication network which form the selected path. Table 8 shows the selected paths for routes from source station ST0 to destination stations ST1, ST2, ST3, ST4, and ST5, which were obtained in the manner described above.

Figure 4:
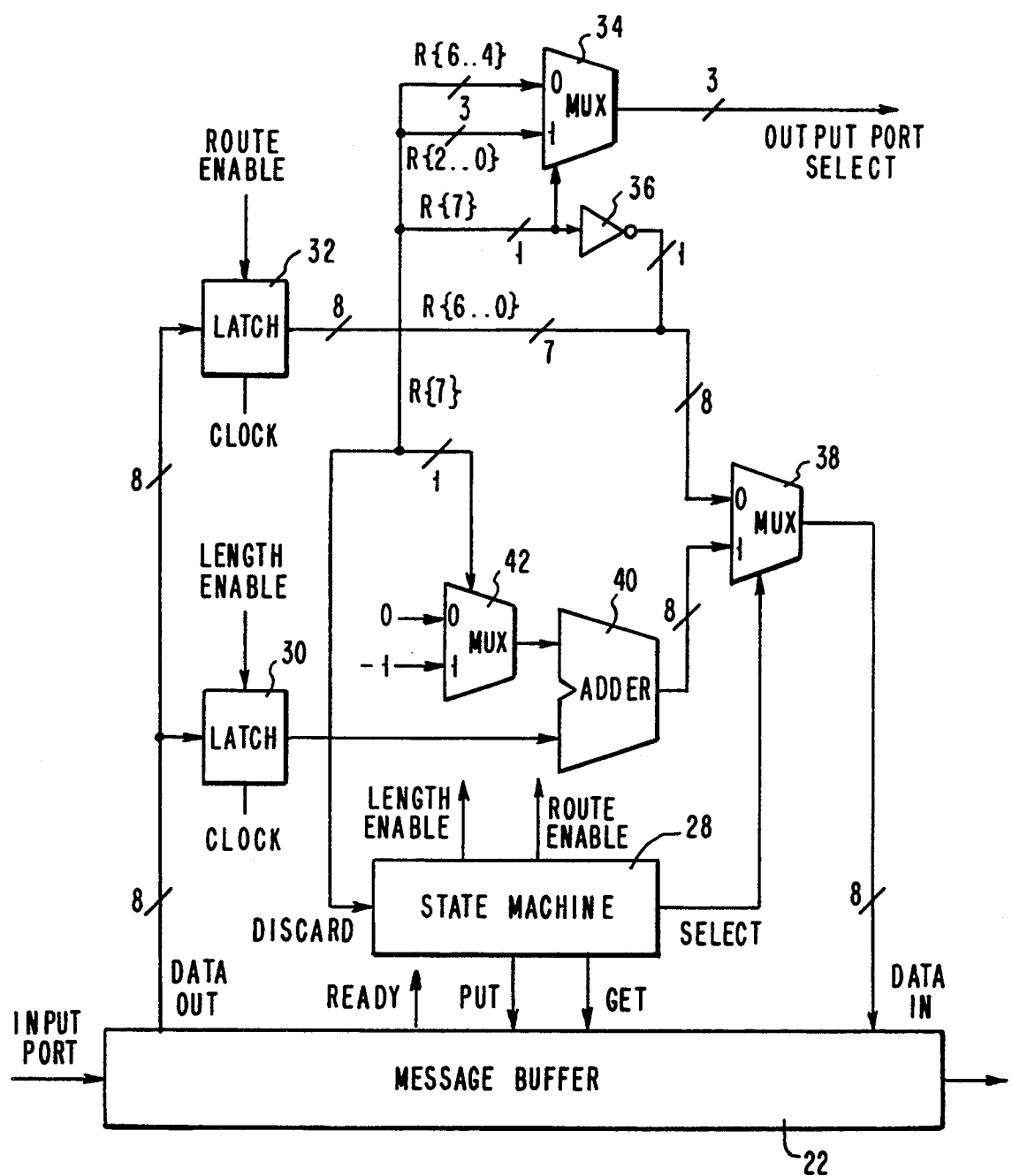
FIG. 4 schematically shows an example of a route logic circuit for use in the switch of FIG. 2.

FIG. 4 schematically shows an example of a route logic circuit 24 used in the switch shown in FIG. 2. When a new message arrives at the message buffer 22, the message buffer provides a ready signal to state machine 28. The state machine loads the message length byte into latch 30 by providing a length enable signal to latch 30 and by providing a get signal to message buffer 22. The state machine then loads the first route byte into latch 32 by providing a route enable signal to latch 32 and by providing a get signal to message buffer 22.

The lower order route field bits R{2...0} in latch 32 are provided to the "true" (1) input of a multiplexer 34. The higher order route field bits R{6...4} in latch 32 are provided to the "complement" (0) input of multiplexer 34. The route field selector bit R{7} is provided to the control input of multiplexer 34.

If the route field selector bit R{7} is "0", the higher order route field bits select the switch output port. If the route field selector bit R{7} is "1", the lower order route field bits select the switch output port.

The route field selector bit R{7} is inverted by inverter 36, is recombined with route bits R{6...0}, and the modified route byte is provided to the "complement" (0) input to multiplexer 38.

At the same time, the length byte in latch 30 is provided to one input of an adder 40. The route field selector bit R{7} is provided to the control input of a multiplexer 42 having an input signal of 0 at its "complement" (0) input and having an input signal of −1 at its "true" (1) input. The output of multiplexer 42 is provided to the other input of adder 40. If the route field selector bit is "0", the output of adder 40 is the original length byte. If the route field selector bit is "1", the output of adder 40 is the original length byte minus 1.

The route field selector bit R{7} is provided to a "Discard" input to state machine 28. If the route field selector bit R{7} is "1", the state machine provides a SELECT signal to multiplexer 38 choosing the "true" input, and provides a "put" signal to message buffer 22, thereby storing the reduced length byte back in the message buffer. If the route field selector bit R{7} is "0", the state machine first provides a SELECT (select complement) signal to multiplexer 38 choosing the "complement" input, and provides a "put" signal to message buffer 22, thereby storing the modified route byte back in the message buffer in front of the message. The state machine then provides a SELECT signal to multiplexer 38 choosing the "true" input, and provides a "put" signal to message buffer 22, thereby storing the original length byte back in the message buffer in front of the modified route byte.

Figure 5:
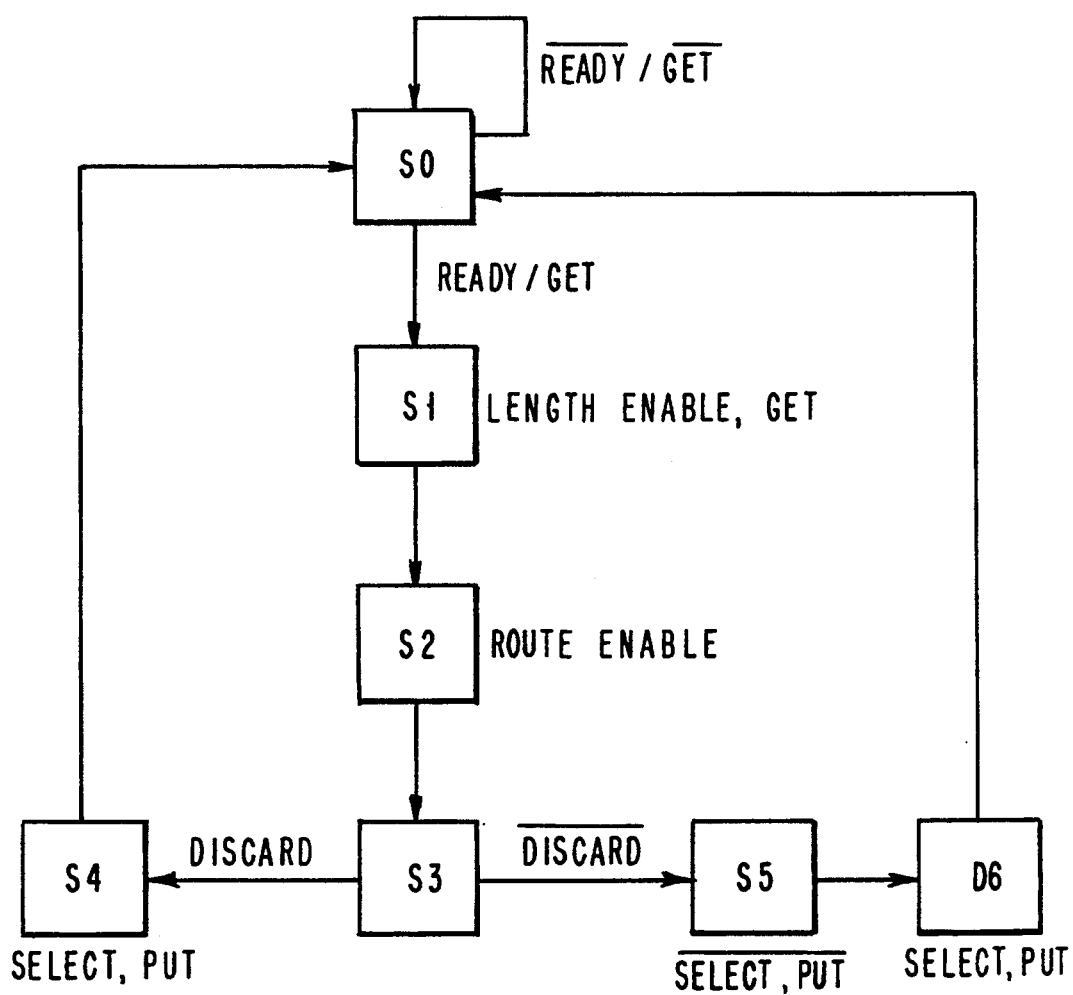
FIG. 5 is an example of a state diagram for the state machine of the route logic circuit of FIG. 4.

FIG. 5 shows the state diagram for the state machine 28 for the route logic circuit of FIG. 4.

In the example of Table 7, some candidate destinations were revisited several times along different paths. In a preferred embodiment of the invention, however, when one or more candidate paths ending at a candidate destination are identified, only the candidate path having the best path weight is extended. No other paths to that candidate destination are further explored. Table 9 shows the revised link weights and Table 10 shows the corresponding routes obtained after the preferred embodiment of the invention has been applied starting with the station ST0 and initial link weights of Table 2.

TABLE 9
LINK WEIGHTS AFTER ALL STATIONS ARE REACHED FROM STATION ST0

| Switch Link | | |
|---|---|---|
| Switch (m) | Output Port (o) | Weight w (o,m) |
| A | 4 | 12 |
| A | 5 | 0 |
| A | 6 | 0 |
| A | 7 | 0 |
| B | 4 | 0 |
| B | 5 | 0 |
| B | 6 | 0 |
| B | 7 | 0 |
| C | 4 | 0 |
| C | 5 | 0 |
| C | 6 | 0 |
| C | 7 | 0 |
| D | 4 | 0 |
| D | 5 | 0 |
| D | 6 | 0 |
| D | 7 | 0 |
| E | 0 | 0 |
| E | 1 | 4 |
| E | 2 | 4 |
| E | 3 | 4 |
| F | 0 | 0 |
| F | 1 | 0 |
| F | 2 | 0 |
| F | 3 | 0 |
| G | 0 | 0 |
| G | 1 | 0 |
| G | 2 | 0 |
| G | 3 | 0 |
| H | 0 | 0 |
| H | 1 | 0 |
| H | 2 | 0 |
| H | 3 | 0 |

TABLE 10
Route Table for Station ST0

| Destination | Route |
|---|---|
| ST1 | A1 |
| ST2 | A2 |
| ST3 | A3 |
| ST4 | A4/E1/B0 |
| ST5 | A4/E1/B1 |
| ST6 | A4/E1/B2 |
| ST7 | A4/E1/B3 |

TABLE 10-continued
Route Table for Station ST0

| Destination | Route |
|---|---|
| ST8 | A4/E2/C0 |
| ST9 | A4/E2/C1 |
| ST10 | A4/E2/C2 |
| ST11 | A4/E2/C3 |
| ST12 | A4/E3/D0 |
| ST13 | A4/E3/D1 |
| ST14 | A4/E3/D2 |
| ST15 | A4/E3/D3 |

In the example of Table 9, the switch link weight for A4 indicates that A4 has been used 12 times to reach destination stations from source ST0, as it can also be seen in Table 10. Likewise, the switch link weight for E1 indicates that E1 has been used 4 timer, namely to reach destination stations ST4, ST5, ST6, and ST7.

Continuing in the manner described above, the preferred embodiment of the invention has been applied for source station ST1 with the initial link weights given in Table 9. This resulted in the revised link weights of Table 11 and the corresponding route table of Table 12.

TABLE 11
LINK WEIGHTS AFTER ALL STATIONS ARE REACHED FROM STATION ST1

| Switch Link | | |
|---|---|---|
| Switch (m) | Output Port (o) | Weight w (o,m) |
| A | 4 | 12 |
| A | 5 | 12 |
| A | 6 | 0 |
| A | 7 | 0 |
| B | 4 | 0 |
| B | 5 | 0 |
| B | 6 | 0 |
| B | 7 | 0 |
| C | 4 | 0 |
| C | 5 | 0 |
| C | 6 | 0 |
| C | 7 | 0 |
| D | 4 | 0 |
| D | 5 | 0 |
| D | 6 | 0 |
| D | 7 | 0 |
| E | 0 | 0 |
| E | 1 | 4 |
| E | 2 | 4 |
| E | 3 | 4 |
| F | 0 | 4 |
| F | 1 | 4 |
| F | 2 | 4 |
| F | 3 | 0 |
| G | 0 | 0 |
| G | 1 | 0 |
| G | 2 | 0 |
| G | 3 | 0 |
| H | 0 | 0 |
| H | 1 | 0 |
| H | 2 | 0 |
| H | 3 | 0 |

TABLE 12
Route Table for Station ST1

| Destination | Route |
|---|---|
| ST0 | A0 |
| ST2 | A2 |
| ST3 | A3 |
| ST4 | A5/F1/B0 |
| ST5 | A5/F1/B1 |
| ST6 | A5/F1/B2 |
| ST7 | A5/F1/B3 |
| ST8 | A5/F2/C0 |

TABLE 12-continued

| Route Table for Station ST1 | |
| --- | --- |
| Destination | Route |
| ST9 | A5/F2/C1 |
| ST10 | A5/F2/C2 |
| ST11 | A5/F2/C3 |
| ST12 | A5/F3/D0 |
| ST13 | A5/F3/D1 |
| ST14 | A5/F3/D2 |
| ST15 | A5/F3/D3 |

In the example of Table 11, it can be seen that the set of routes for station ST1 were selected over the switch link A5 and that all the routes avoid switch link A4 to prevent congestion at A4, because A4 has been used 12 times previously as shown in Table 9.

I claim:

1. A method of sending an electronic message from a source station through a network of a plurality of switches and links to a destination station, said method comprising:

generating a series of one or more route signals, each route signal identifying an output port of a switch in the network of switches;

compiling the series of route signals into an electronic message; and sequentially sending the message to each of a series of one or more switches, each switch reading a route signal in the message and sending the message to a component having an input port connected to an output port identified by the route signal;

characterized in that the step of generating the series of route signals comprises the steps of:

(a) storing in a location accessible to each said source station a weight $w_o^m$ for each switch link connecting an output port of each of said switches to an input port of another of said switches, where m identifies the switch having an output port and o identifies the output port of that switch;

(b) identifying one or more candidate paths through the switch network starting at the source station and ending at initial candidate destinations, each initial candidate destination comprising a component having an input port directly connected to an output port of a switch having an input port directly connected to the source station;

(c) if one or more initial candidate destinations are the destination station, selecting a candidate path ending at the destination station, and generating in the source station a series of route signals corresponding to the selected candidate path, and changing the weight $w_o^m$ of each switch link forming the candidate path; otherwise (d) identifying one or more extended candidate paths through the switch network starting at the source station and ending at next candidate destinations, each next candidate destination comprising a component having an input port directly connected to an output port of an immediately preceding candidate destination, each extended candidate path having a path weight comprising the weights of switch links along the candidate path; and then (e) if one or more candidate destinations are the destination station, selecting a candidate path ending at the destination station and having a path weight which is less than or equal to the path weight of each other candidate path ending at the destination station, and generating in the source station a series of route signals corresponding to the selected candidate path and changing the weight $w_o^m$ of each switch link forming the candidate path; otherwise (f) return to step (d).

2. A method as claimed in claim 1, characterized in that each candidate path comprises:

a series of one or more switches starting with the switch having an input port directly connected to the source station and ending with a switch having an output port directly connected to the candidate destination of the candidate path;

a station link connecting the source station to an input port of the starting switch; and a station link connecting the output port of the ending switch to the destination station.

3. A method as claimed in claim 2, characterized in that each extended candidate path further comprises one or more switch links connecting an output port of a switch in the path with an input port of another switch in the path.

4. A method as claimed in claim 1, characterized in that:

each pair of extended candidate paths contain a common root path extending from the source station to a common branch switch from which the paths diverge;

the path weight of a first candidate path is less than the path weight of a second candidate path if the weight of the switch link of the first candidate path connected to an output of the common branch switch for the first and second candidate paths is less than the weight of the switch link of the second candidate path connected to an output of the common branch switch for the first and second candidate paths.

5. A method as claimed in claim 4, characterized in that the step of generating a series of route signals corresponding to the selected candidate path comprises generating a series of route signals identifying switch output ports connected to the links forming the selected candidate path.

6. A method as claimed in claim 5, characterized in that the step of storing weights for the switch links comprises storing an initial value K for the weight $w_o^m$ for each switch link connected to an output port $o_m$ of a switch m, where K is a selected constant.

7. A method as claimed in claim 5, characterized in that the step of changing the weights of switch links forming the selected candidate path comprises increasing the weight of each switch link forming the selected candidate path by a constant K'.

8. A method as claimed in claim 7, characterized in that $K=0$ and $K'=+1$.

9. A method as claimed in claim 7, further comprising the steps of:

storing the series of route signals in a route table; and generating the message by reading the series of route signals from the route table.

10. A method as claimed in claim 9, characterized in that:

the destination station has an input port; and the last route signal in the series of route signals in the message identifies a switch output pork directly connected to the input port of the destination station.

11. A method as claimed in claim 10, characterized in that the step of sequentially sending the message comprises the steps of:

(1) sending the message to a first switch having an input port directly connected to the source station, said first switch having at least two output ports;

(2) reading a route signal in the message, said route signal identifying an output port of the first switch; and (3) sending the message to a second switch having an input port directly connected to the output port of the first switch identified by the read route signal.

12. A method as claimed in claim 11, further comprising the step of disabling the route signal in the message after reading the route signal.

13. A method as claimed in claim 1, characterized in that each extended candidate path has a path weight comprising the sum of the weights of switch links along the candidate path.

14. A method of assigning a communication route from a source station through a network of a plurality of switches and links to a destination station, said method comprising:

(a) storing in the source station a weight $w_o^m$ for each switch link connecting an output port of each of said switches to an input port of another switch, where m identifies the switch having an output port and o identifies the output port of that switch;

(b) identifying one or more candidate paths through the switch network starting at the source station and ending at initial candidate destinations, each initial candidate destination comprising a component having an input port directly connected to an output port of a switch having an input port directly connected to the source station;

(c) if one or more initial candidate destinations are the destination station, selecting a candidate path ending at the destination station, generating in the source station a series of route signals corresponding to the selected candidate path, and changing the weight $w_o^m$ of each switch link forming the selected candidate path; otherwise (d) identifying one ore more extended candidate paths through the switch network starting at the source station and ending at next candidate destinations, each next candidate destination comprising a component having an input port directly connected to an output port of an immediately preceding candidate destination, each extended candidate path having a path weight comprising the weights of switch links along the candidate path; and then (e) if one or more candidate destinations are the destination station, selecting a candidate path ending at the destination station and having a path weight which is less than or equal to the path weight of each other candidate path ending at the destination station, generating in the source station a series of route signals corresponding to the selected candidate path, and changing the weight $w_o^m$ of each switch link forming the selected candidate path; otherwise (f) return to step (d).

15. A method as claimed in claim 14, characterized in that each candidate path comprises:

a series of one or more switches starting with a switch having an input port directly connected to the source station and ending with a switch having an output port directly connected to the candidate destination of the candidate path;

a station link connecting the source station to an input port of the switch having an input port directly connected to the source station; and a station link connecting the output port of the ending switch to the destination station.

16. A method as claimed in claim 15, characterized in that each extended candidate path further comprises one or more switch links connecting an output port of a switch in the path with an input port of another switch in the path.

17. A method as claimed in claim 16, characterized in that:

each pair of extended candidate paths contain a common root path extending from the source station to a common branch switch from which the paths diverge;

the path weight of a first candidate path is less than the path weight of a second candidate path if the weight of the switch ink of the first candidate path connected to an output of the common branch switch for the first and second candidate paths is less than the weight of the switch link of the second candidate path connected to an output of the common branch switch for the first and second candidate paths.

18. A method as claimed in claim 17, characterized in that the step of generating a series of route signals corresponding to the selected candidate path comprises generating a series of route signals identifying switch output ports connected to the links forming the selected candidate 19. A method as claimed in claim 18, characterized in that the step of storing weights for the switch links comprises storing an initial value K for the weight $w_o^m$ for each switch link connected to an output port $o_m$ of a switch m, where K is a selected constant.

20. A method as claimed in claim 19, characterized in that the step of changing the weights of switch links forming the selected candidate path comprises increasing the weight of each switch link forming the selected candidate path by a constant K'.

21. A method as claimed in claim 20, characterized in that $K=0$ and $K'=+1$.

22. A method as claimed in claim 14, further comprising the steps of:

storing the series of route signals in a route table; and generating the message by reading the series of route signals from the route table.

23. A method as claimed in claim 22, characterized in that:

the destination station has an input port; and the last route signal in the series of route signals in the message identifies a switch output port directly connected to the input port of the destination station.

24. A method as claimed in claim 23, characterized in that each extended candidate path has a path weight comprising the sum of the weights of switch links along the candidate path.

25. A method as claimed in claim 1, wherein said component is a switch.

26. A method as claimed in claim 1, wherein said component is a station.

27. A method as claimed in claim 14, wherein said component is a switch.

28. A method as claimed in claim 14, wherein said component is a station.

* * * * *